US012775767B2

(12) United States Patent
Bisht et al.

(10) Patent No.: US 12,775,767 B2
(45) Date of Patent: Oct. 27, 2026

(54) DYNAMIC CDC VERIFICATION METHOD

(71) Applicant: Siemens Industry Software Inc., Plano, TX (US)

(72) Inventors: Sukriti Bisht, Janskpuri (IN); Ashish Hari, Noida (IN); Sulabh Kumar Khare, Noida (IN); Kurt Takara, Cupertino, CA (US)

(73) Assignee: Siemens Industry Software Inc., Plano, TX (US)

(*) Notice: Subject to any disclaimer, the term of this patent is extended or adjusted under 35 U.S.C. 154(b) by 776 days.

(21) Appl. No.: 18/023,819

(22) PCT Filed: Aug. 31, 2020

(86) PCT No.: PCT/US2020/048681
§ 371 (c)(1),
(2) Date: Feb. 28, 2023

(87) PCT Pub. No.: WO2022/046089
PCT Pub. Date: Mar. 3, 2022

(65) Prior Publication Data
US 2023/0306172 A1 Sep. 28, 2023

(51) Int. Cl.
*G06F 30/3312* (2020.01)
*G06F 30/20* (2020.01)
(Continued)

(52) U.S. Cl.
CPC .......... *G06F 30/3312* (2020.01); *G06F 30/20* (2020.01); *G06F 30/3323* (2020.01); *G06F 30/396* (2020.01); *G06F 2119/12* (2020.01)

(58) Field of Classification Search
CPC .. G06F 30/3312; G06F 30/3323; G06F 30/20; G06F 30/396; G06F 30/398
(Continued)

(56) References Cited

U.S. PATENT DOCUMENTS 7,243,322 B1 * 7/2007 Ly .............................. G06F 30/33 716/108
7,356,789 B2 * 4/2008 Ly .......................... G06F 30/3308 716/108
(Continued)

FOREIGN PATENT DOCUMENTS

CN 103748837 A 4/2014
CN 108563545 A 9/2018
(Continued)

OTHER PUBLICATIONS

Takara, "How Automated CDC Protocol Verification Accelerates Testing Processes", Industry Aritcle, Nov. 14, 2019, 12 pages. (Year: 2019).*
(Continued)

*Primary Examiner* — Phallaka Kik
(74) *Attorney, Agent, or Firm* — Lempia Summerfield Katz LLC

(57) ABSTRACT

A computer implemented method of dynamically verifying clock domain crossing (CDC) paths in a register-transfer level (RTL) design is provided. In addition to static analysis, formal analysis, and simulation steps, each CDC path is allocated a persistent unique identifier. This enables the updating of a centralized results database using the persistent unique identifier to label the associated CDC protocol assertions, functional coverage, and results of the formal analysis and simulation. In addition, prior to simulation analysis, CDC protocol assertions that have been proven during formal analysis are turned off, resulting in the simulation run only being carried out for non-proven CDC protocol assertions.

20 Claims, 3 Drawing Sheets

(51) Int. Cl.
*G06F 30/3323* (2020.01)
*G06F 30/396* (2020.01)
*G06F 119/12* (2020.01)

(58) Field of Classification Search
USPC ............... 716/108, 113, 136; 703/16, 17, 19
See application file for complete search history.

(56) References Cited

U.S. PATENT DOCUMENTS 7,962,886 B1 * 6/2011 Pandey ................... G06F 30/30 716/136
8,271,918 B2 * 9/2012 Kwok ................. G06F 30/3323 716/108
8,595,668 B1 * 11/2013 Soni ...................... G06F 30/396 716/108
8,631,364 B1 * 1/2014 Dobkin ................... G06F 30/34 716/108
9,043,737 B2 * 5/2015 Bahadra .............. G06F 30/3312 716/108
9,355,206 B2 * 5/2016 Ikram ................. G06F 30/3323
9,384,161 B2 7/2016 Lowe et al.
9,633,151 B1 * 4/2017 Sun ..................... G06F 30/3308
2005/0268265 A1 * 12/2005 Ly ....................... G06F 30/3308 716/108
2008/0288904 A1 * 11/2008 Rahim ................ G06F 30/3312 716/113
2010/0199244 A1 * 8/2010 Kwok ................. G06F 30/3323 716/113
2013/0132760 A1 * 5/2013 Talupuru ................... G06F 1/08 713/400
2013/0246985 A1 9/2013 Ly et al.
2014/0282321 A1 * 9/2014 Sarwary .............. G06F 30/3323 716/108
2014/0325463 A1 * 10/2014 Bahadra .............. G06F 30/3312 716/108
2015/0317422 A1 * 11/2015 Jin .......................... G06F 30/30 716/107
2015/0347652 A1 * 12/2015 DiLullo .............. G06F 30/3312 716/136
2016/0259879 A1 * 9/2016 Ganai ................... G06F 30/398
2016/0292331 A1 * 10/2016 Gupta .................. G01R 31/317
2016/0300009 A1 10/2016 Sarwary et al.
2021/0209279 A1 * 7/2021 Malani ................ G06F 30/3308

FOREIGN PATENT DOCUMENTS

CN 111031015 A 4/2020
CN 111031015 B * 5/2022 ............. H04L 69/08

OTHER PUBLICATIONS

TDF_Editor, "Automating the pain out of clock domain crossing verification", Dec. 17, 2019, 3 pages. (Year: 2019).*
Verma et al., "Understanding Clock Domain Crossing (CDC) Checks and Techniques", EE/TImes, Dec. 24, 2007, 22 pages. (Year: 2007).*
Synopsys, "SystemVerilog for RTL Modeling, Simulation, and Verification—Introduction", https://systemverilog.dev/9.htlm#, 1800-2023, first appear in 2002, chapter 9, 35 pages. (Year: 2002).*
Ayari Abdelouahab et al: "Don't Forget the Protocol! A CDC Protocol Methodology to Avoid Bugs in Silicon", Verification Horizons, vol. 15, No. 3 , Dec. 31, 2019.
Bisht Sukriti et al: "Don't Forget the 1-20 Protocol! A CDC Protocol Methodology to Avoid Bugs in Silicon | VerificationbrHorizons—Jun. 2019 | Verification Academy", Jun. 30, 2019 (Jun. 30, 2019), XP055781116, URLzhttps://verificationacademy.com/verifi/abrcation-horizons/june-2019-volume-15-issue-br2/a-cdc-protocol-methodology-to-avoid-bugsbr-in-siliconbr.
International Search Report and Written Opinion for International App. PCT/US2020/048681 mailed Mar. 12, 2021.

* cited by examiner

DYNAMIC CDC VERIFICATION METHOD

This application is the National Stage of International Application No. PCT/US2020/048681, filed Aug. 31, 2020. The entire contents of this document are hereby incorporated herein by reference.

BACKGROUND

The present embodiments relate to dynamic Clock Domain Crossing (CDC) verification.

Digital circuit design often employs a hardware description language to create a high-level representation of a circuit. Synchronous digital circuits may use a design abstraction known as Register-Transfer Level (RTL) to model the flow of digital signals between hardware registers. Each hardware register is edge-triggered by a clock signal, making the output of each register synchronous to its clock signal. A Clock Domain Crossing (CDC) path is a path in an RTL design between a source register and a destination register where the clock of the source register is asynchronous to the clock of the destination register, enabling the transmission of a CDC signal. When two clocks are asynchronous, there is no deterministic phase relationship between the clocks. Given this asynchronicity, the source register may create an asynchronous signal that may violate the setup and hold requirements for the destination register, causing the destination register to enter a metastable state. Traditionally, this issue is addressed using synchronization logic structures (e.g., synchronizers) that are RTL structures added to the CDC path to prevent the propagation of metastable events to downstream logic. Although adding a synchronizer to the CDC path will eliminate the metastability in some structures, by itself, it is not sufficient to provide that CDC signals are transmitted reliably. Each synchronizer is dependent on a set of assumptions or protocols, which, when violated, cause data loss or corruption, or, in a worst-case scenario, allow the metastable state to be transmitted to downstream logic (e.g., exactly the situation that a designer is trying to avoid). Such events eventually lead to the functional failure of the RTL design.

To avoid these issues, two processes are used: static CDC verification and dynamic CDC verification. As the name implies, static CDC verification uses static structural analysis techniques to determine the correct synchronization structure of a digital circuit without requiring the full simulation of the circuit. Dynamic CDC verification uses simulation of the full circuit and/or formal model checking analysis of the full circuit to determine whether or not protocols will be violated when using certain synchronizers. This is done by the generation of assertions for synchronizer protocols and verifying the assertions in the formal or simulation environments.

FIG. 1 illustrates data loss in for a synchronizer employing two flip-flops (DFF) due to protocol violation. FIG. 1 shows the source register Tx, destination register Rx, and the resulting synchronized signal Rxsync. The source clock Txclock provides the signal for the source register, and the destination clock Rxclock provides the signal for the destination register and synchronized signal. Initially, a single square wave is transmitted by the source register Tx at time t=t. At the same time, the destination register clock Rxclock transmits a clock signal having a frequency of 0.5. The protocol being used is NUM_CYCLES=2, and, as illustrated by the code below, the protocol is violated, resulting in the Tx signal being corrupted on transmission to the destination register Rx at time t=t and no synchronized signal present on Rxsync at all:

```
property data_stable_prop(data, clock, reset, arrest,
    NUM_CYCLES):
    @(posedge clock) disable iff(areset)
##1 !reset && $changed(data) 1=>$stable(data)
    [*(NUM_CYCLES-1)];
endproperty
```

FIG. 2 illustrates typical assertion-based verification methods to verify synchronizer protocols. A RTL design 1 is evaluated using static CDC analysis 2 to analyze the CDC paths and synchronizer structures for signal transmission between the registers, and CDC protocol assertions 3 are generated for each CDC path. In a formal analysis environment 4, the data from the RTL design 1 is input along with the CDC protocol assertions 3, and formal constraints 5 are added (e.g., clock, reset, and constant constraints) in order to run the analysis and display any protocol violations 6. In a simulation environment 7, the data from the RTL design 1 and testbench data 8 are input to simulate the entire digital circuit, along with the CDC protocol assertions 3 in order to determine the protocol violations and display 9.

The use of these three systems, however, is complex and time consuming since significant time and effort is required to set up the RTL design for both the formal and simulation runs, as the CDC constraints and directives are to be translated into each environment. The debug effort in reviewing the results from the two environments is also lengthy, since results are to be reviewed in three environments (e.g., as the formal and simulation environments differ from the static CDC analysis) and any debug effort needs to be made in each environment. Use of inaccurate constraints may result in a large number of false firings (e.g., where a protocol assertion is falsely violated). For example, errors in specifying the clock frequencies may result in incorrect design behaviour. Relating the formal and simulation results back to the static CDC analysis is tricky, since there is no correlation between the results in each environment. Manual correlation takes significant time due to the complexity of the various synchronizers involved, such as first in-first out (fifo) and handshake, where each has multiple assertions that are treated as separated entities in the formal and simulation environments yet relate back to a single CDC path. While it may appear that using both formal and simulation environments together should offer a benefit to the user, a certain amount of redundancy and effort of reutilization occurs, as any assertions that were proven in the formal analysis are unnecessarily re-verified in simulation.

The formal analysis itself requires expertise to carry out. The formal model checking of the assertion protocols will result in three types of results:

- Proven: the assertion is proved for all occurrences—an exhaustive algorithmic proof that an assertion cannot be violated;
- Violated: the assertion is violated—a formal counter-example showing a stimulus set that violates the assertion, illustrated by a waveform generated to show the stimulus in question;
- Inconclusive: formal analysis is unable to generate a proof or detect a violation—the design may be too large, the assertion is too difficult to solve, a lack of computer resources, deficiencies in the formal algorithms, for example.

The formal environment also requires designers to specify formal setup constraints that include design configuration information, clock information, and input port information.

This information includes constants to specify configuration of ports and registers, clock specifications and frequencies, and specifications of primary input ports and associated clock frequencies. Without such an existing formal environment, any formal model checks runs unconstrained without any constraints to describe the legal and illegal stimuli for the design. This results in the detection of false assertion violations based on an illegal stimulus and generates inconclusive results. The lack of any assertion constraints to describe the legal and illegal stimuli increases the logical state space for formal model checking analysis. With a large state space, it becomes increasingly difficult for the formal analysis to converge on a proof or counter-example. Overcoming these difficulties requires time and the use of advanced formal analysis techniques, both of which may not be available to a designer.

SUMMARY AND DESCRIPTION

The present embodiments aim to address these issues by providing, in a first aspect, a computer implemented method of dynamically verifying clock domain crossing (CDC) paths in a register-transfer level (RTL) design. The computer-implemented method includes extracting, from a CDC static analysis database, information regarding the presence of structures in the CDC path and any associated CDC protocol assertions and functional coverage; binding the CDC protocol assertions and functional coverage to the RTL design in a bind file; generating formal analysis and simulation setup files from the RTL design, setup, and constraint data for the CDC path extracted from the static CDC analysis database and compiling the bind files using the generated formal analysis and simulation setup files; running formal analysis of the RTL design to determine proven and non-proven CDC protocol assertions; updating the simulation setup files to turn off the proven CDC protocol assertions; running the simulation of the RTL design with the non-proven protocol assertions and functional coverage; updating a centralized results database with the results of both the formal analysis and the simulation of the RTL design; and generating a visualization of the formal analysis and simulation results for at least one of reviewing or debugging. Each CDC path is allocated a persistent unique identifier. The centralized results database is updated using the persistent unique identifier to label the associated CDC protocol assertions, functional coverage, and results of the formal analysis and simulation.

Unlike prior art systems, the embodiments offer a designer the ability to visualize the results of all three analysis environments simultaneously, and to be able to alter RTL code without affecting the consistency of this visualization. By turning off proven CDC protocol assertions in the simulation setup files after formal analysis, a significant saving in time taken for simulation is achieved when compared with existing CDC protocol assertion verification methodologies. In addition, the coverage offered for the CDC protocol assertion verification is higher than in existing methods when using embodiments of the present invention.

In one embodiment, the CDC path information includes at least one text string. The persistent unique identifier is a numerical string generated from the text string. In one embodiment, the numerical string is generated using a mathematical operation to reduce the number of characters in the text string. In one embodiment, the persistent unique identifier is added to the assertion of the CDC path and functional coverage instance names. In addition, the persistent unique identifier may be added to the CDC protocol assertion associated with structures in the CDC path.

In one embodiment, the structures in the CDC path are CDC synchronizers, and the associated CDC protocol assertions are generated based on the type of the CDC synchronizer.

In one embodiment, when there is an absence of structures in the CDC path, the associated CDC protocol assertions are generated based on the absence of the structure.

In one embodiment, the non-proven CDC protocol assertions are violated or inconclusive.

In one embodiment, during formal analysis, a counter-example is generated indicating a stimulus that violates a CDC protocol assertion.

In one embodiment, during formal analysis, a sanity waveform is generated for proven CDC protocol assertions indicating a stimulus that does not violate a CDC protocol assertion. In one embodiment, the visualization of the formal analysis results includes displaying the sanity waveform. In one embodiment, the visualization of the formal analysis and simulation results includes displaying a waveform showing the stimulus that violates the CDC protocol assertion.

In one embodiment, the simulation argument files and the formal files include callback functions to enable updating of the centralized results database. In one embodiment, the simulation argument files employ a PLI callback function to capture assertion information including data showing whether a stimulus violated a CDC protocol assertion or not.

In one embodiment, the method further includes the act of updating the static CDC analysis database with results information for the CDC protocol assertion and functional coverage.

In one embodiment, the CDC protocol assertions are SystemVerilog Assertions (SVAs). In addition, the CDC protocol functional coverage may be SystemVerilog coverpoints and covergroups.

In one embodiment, the setup files include: simulation compile and simulation arguments files; formal analysis compile and run scripts; and formal analysis constraints files.

The present embodiments also provide, in a second aspect, a data processing system including a processor adapted to carry out the acts of the method.

The present embodiments also provide, in a third aspect, a computer program including instructions that, when the computer program is executed by a computer, causes the computer to carry out the acts of the method.

DETAILED DESCRIPTION

In contrast to existing methods in the art, the present embodiments use an identification system that tracks through CDC static analysis into the CDC dynamic analysis including formal model checking and simulation and enables the visualization of results. The method of embodiments dynamically verifies clock domain crossing (CDC) paths in a register-transfer level (RTL) design. First, information regarding a presence of structures in the CDC path and any associated CDC protocol assertions and functional coverage is extracted from a CDC static analysis database. Next, the CDC protocol assertions and functional coverage are bound to the RTL design in a bind file. This enables the formal analysis and simulation setup files to be generated from the RTL design with the setup and constraint data for the CDC path extracted from the static CDC analysis database. The bind files are then compiled using the generated formal analysis and simulation setup files. Formal analysis of the RTL design is run to determine proven and non-proven CDC protocol assertion. This enables the updating of the simulation setup files to turn off the proven CDC protocol assertions. Then, the simulation of the RTL design is run with the non-proven CDC protocol assertions and functional coverage. Once this occurs, a centralized results database is updated with the results of both the formal analysis and the simulation of the RTL design, and a visualization of the formal analysis and simulation results is generated for at least one of reviewing or debugging. Each CDC path is allocated a persistent unique identifier, such that the centralized results database is updated using the persistent unique to label the associated CDC protocol assertions, functional coverage, and results of the formal analysis and simulation.

Figure 1:
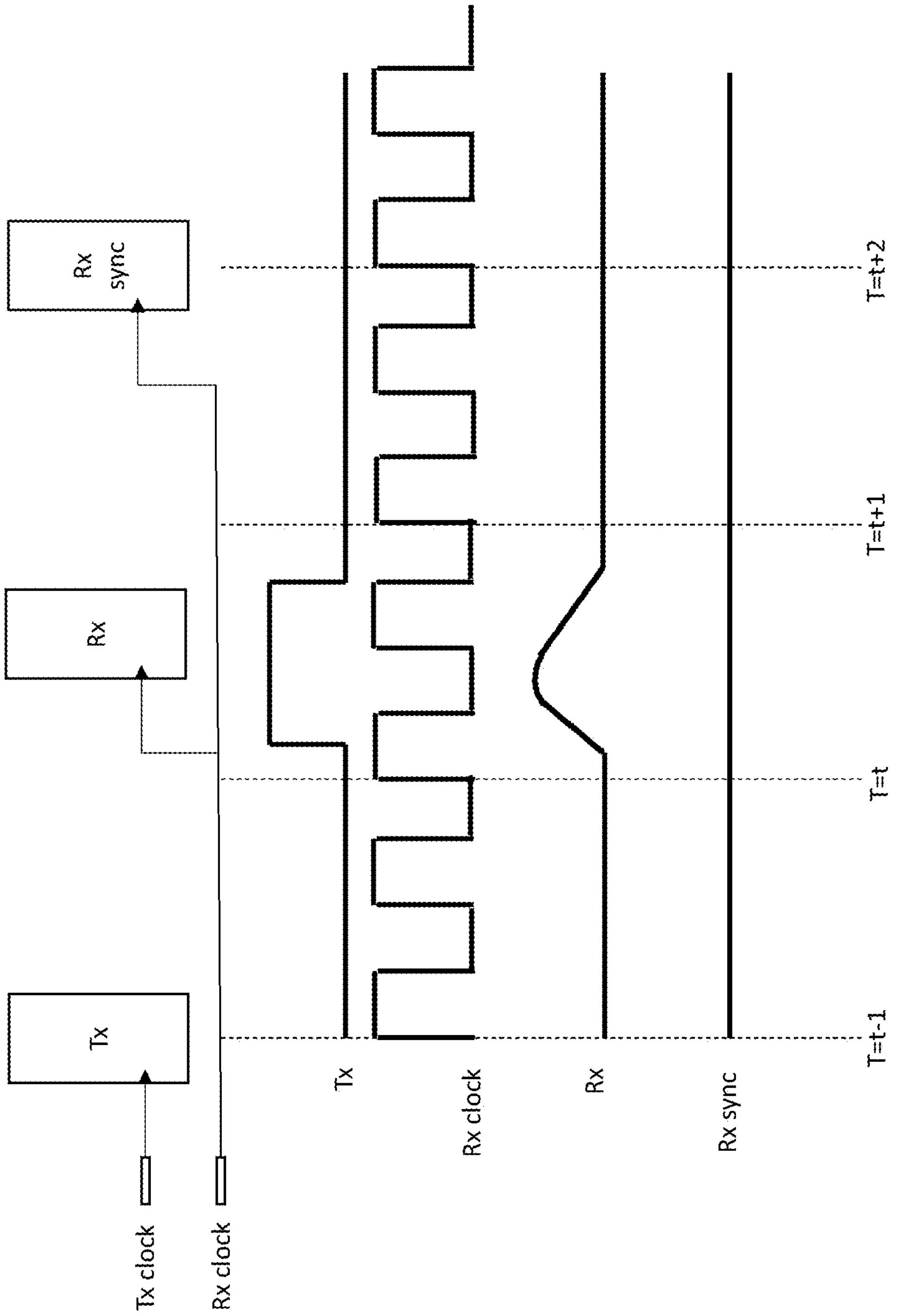
Figure 1 PRIOR ART
FIG. 1 illustrates data loss for a synchronizer employing two flip-flops (DFF) due to protocol violation.
Figure 2:
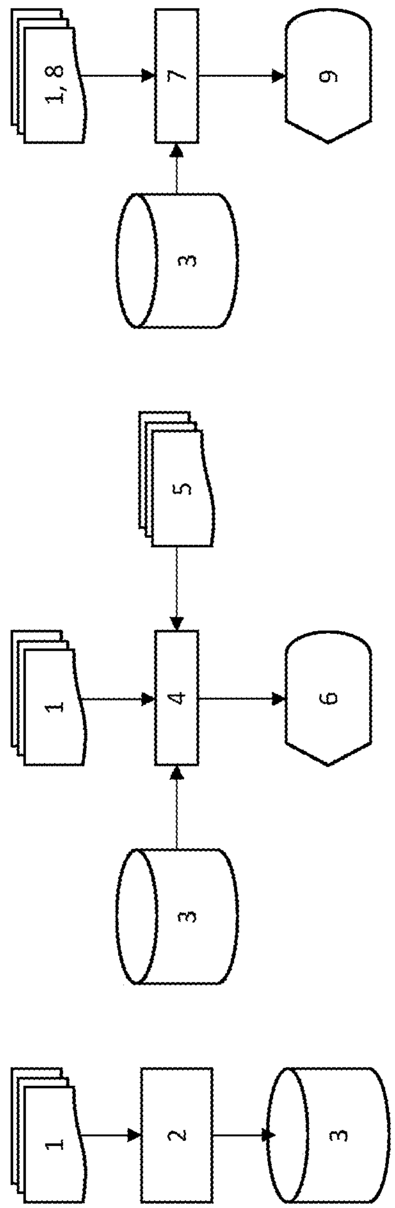
Figure 2 PRIOR ART
FIG. 2 illustrates typical assertion-based verification methods to verify synchronizer protocols.
Figure 3:
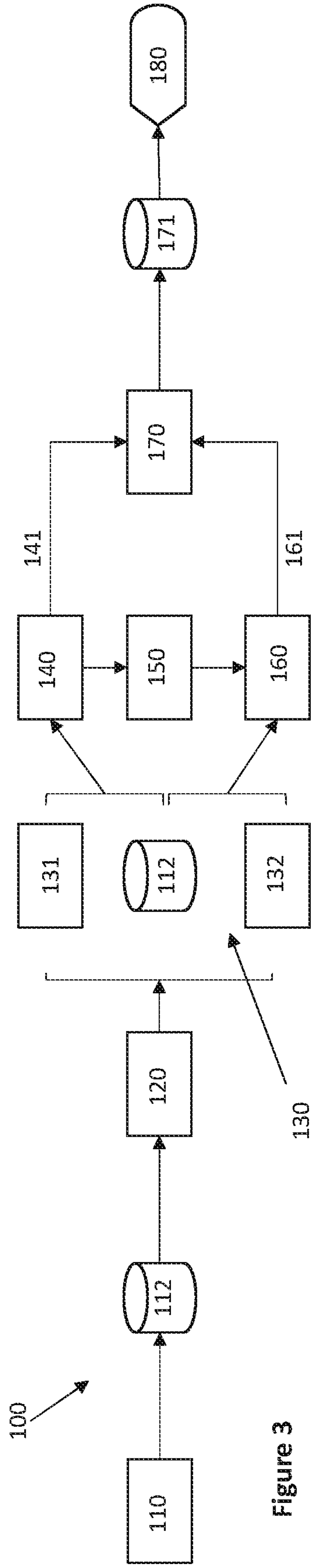
FIG. 3 is a flowchart illustrating an overview of methods in accordance with embodiments.

A top-level view of a method in accordance with an embodiment is shown in FIG. 3. FIG. 3 is a flowchart illustrating an overview of methods in accordance with embodiments. As a starting point, the method 100 requires that at some point, static CDC analysis 110 has been carried out, or that the processing device(s) carrying out the method 100 is able to access a static CDC analysis database 112, containing details of CDC paths, including the presence of structures, such as CDC synchronizers, in the CDC path, and any associated CDC protocol assertions and functional coverage. The functional coverage defines the region exercised by the simulation with respect to the CDC protocol assertion (e.g., the range of x for which a statement regarding x has been exercised or not). At act 120, the information regarding the presence of structures in the CDC path, any associated CDC protocol assertions, and functional coverage is extracted from the static CDC analysis database 112. At this point, at act 130, the setup files for both formal analysis 131 and simulation 132 are generated from the RTL design, and the setup and constraint data for the RTL design is extracted from the static CDC analysis database 112. The bind files are then compiled using these generated formal analysis and simulation setup files. Act 140 is the running of the formal analysis of the RTL design to determine which of the protocol assertions are proven and which are non-proven. At act 150, the simulation setup files are updated to turn off the proven CDC protocol assertions, leaving on the non-proven protocol assertions to be used during the simulation phase. At act 160, a simulation of the RTL is run using the non-proven assertions and functional coverage. At this point, at act 170, a centralized results database 171 is updated with the results of the both the formal analysis and the simulation of the RTL design. Finally, at act 180, a visualization of the formal analysis and simulation results for reviewing and/or debugging takes place. Each CDC path is allocated a persistent, unique identifier, enabling the updating of the centralized results database 171 using the persistent unique identifier to label the associated CDC protocol assertions, functional coverage, and result of the formal analysis and simulation.

The acts outlined above will now be described in more detail below.

Binding CDC Protocol Assertions

Figure 4:
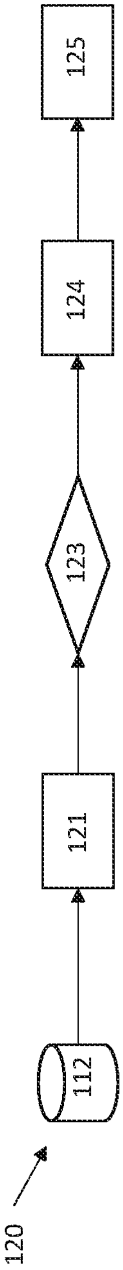
FIG. 4 is a schematic representation of acts carried out by embodiments to bind CDC protocol assertions.

FIG. 4 is a schematic representation of the acts carried out by embodiments to bind CDC protocol assertions. As outlined above, in act 120, the information regarding the presence of structures in the CDC path, any associated CDC protocol assertions, and functional coverage are extracted from the static CDC analysis database 112. During this act, a number of actions occur, beginning with the extraction of information regarding the presence of structures in the CDC path at act 121. This CDC path has been allocated a persistent unique identifier, the process of assigning which is discussed below. In one embodiment, such structures are CDC structures or schemes as illustrated in Table 1 below:

TABLE 1 examples of CDC structures and schemes

| Checker | SVA Checks | CDC Scheme |
|---|---|---|
| cdc_sync | tx_stable | Dual flip-flop and pulse synchronizer |
| cdc_hamming_one | tx_stable<br>tx_hamming | Data bus dual flip-flop synchronizer and reconvergence |
| cdc_dsel | tx_data_stable<br>rx_data_stable<br>tx_select_stable | DMUX (demultiplexer) synchronizer |
| cdc_fifo | pointer_hamming<br>pointer_stable<br>full/empty | First in-first out (FIFO) synchronizer |
| cdc_handshake | data_stable<br>req/ack_assert<br>req/ack_deassert<br>req/ack_stable | Handshake synchronizer |
| cdc_sample | tx_stable | Missing synchronizer violation |
| cdc_glitch | tx_stable | Combinational logic violation |

"Check" represents the module name for the CDC assertion module correlating to a CDC structure, "SVA Checks" represents the CDC protocol assertions included in the CDC assertion module, and "CDC Scheme" represents the type of scheme or structure detected on a CDC path. It may also be possible that there is no CDC synchronizer detected in the CDC path. In this case, a CDC protocol assertion will still be generated, but this will be a pessimistic CDC protocol assertion, indicating the lack of CDC synchronizer in the CDC path. Where the CDC structure is a CDC synchronizer, only one, or none, will be detected in a CDC path.

In order to generate the CDC protocol assertion, the CDC structure is iterated over the entire CDC static analysis database 112 at act 123. During this, the logic for each CDC structure (e.g., all of the connections for the CDC protocol assertion for the CDC structure) is inferred and generated. Where the CDC structure is a CDC synchronizer, this process results in a single or no CDC synchronizers, and its associated CDC protocol assertions and functional coverage is fully identified at act 124. At act 125, the CDC protocol assertions and their functional coverage are bound to the RTL design in a design file, along with tcl callback functions to enable updating of a formal analysis database once the run is complete.

Generating Setup Files

Figure 5:
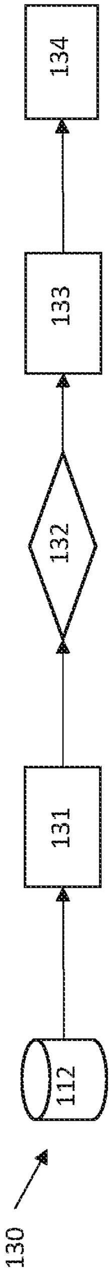
FIG. 5 is a schematic representation of acts carried out by embodiments to generate setup files.

FIG. 5 is a schematic representation of the acts carried out by embodiments to generate setup files. Act 130 involves the generation of the setup files for both the formal analysis and the simulation. At act 131, RTL design, setup, and constraint data is extracted from the CDC static analysis database 112 for use in generating setup files for both formal analysis and simulation. For formal analysis, the constraints are generated automatically. The CDC protocol generation utility converts the CDC information for constant, stable, grey-code signals into formal constraints and assumptions for formal verification. In addition, input and output port clock domain information will also be converted into formal constraints to improve the accuracy of formal counter-examples. Additional constraint data for formal analysis may be specified by the designer and includes information regarding the legal (e.g., allowed) and illegal (e.g., not allowed) stimuli for the RTL design. These constraints define the legal state space of the design used in the proofs or violations of the CDC assertion protocols over the legal state space, also specified by the designer. At act 132, the information obtained from the CDC static analysis database 112 is translated into the correct format for use in a formal analysis tool and in a simulation tool and added to the setup for the respective tool. At act 133, the setup files for the formal analysis and the simulation are generated based on the information extracted from the CDC static analysis database 112. The setup files for the formal analysis include compilation and run scripts to perform the formal analysis on the CDC protocol assertions generated in act 122, as well as formal analysis constraints files. In addition, the setup files are provided with callback functions, which, for formal analysis, may be a tcl callback function, to enable updating of the centralized results database 171 with the results of the formal analysis. Simulation setup files are simulation compile and simulation argument files generated for compilation, elaboration, and simulation. The simulation argument files may be used by designers to include CDC protocol assertions and associated bindings easily into the simulation without needing to modify the original RTL design. At act 134, the generated setup files are used to compile the bind files, ready for the formal analysis and simulation runs.

Exclude Proven Assertions

One key advantage of the embodiments over the prior art is the ability to update the simulation setup files by removal (or turning off) of CDC protocol assertions that have been proven in the formal analysis. To enable this, the formal analysis is run first at act 140, which results in a number of CDC protocol assertions being proven and a number being non-proven. The formal analysis results are iterated over in order to identify the proven assertions. The formal proofs are exhaustive and determine that a CDC protocol assertion cannot be violated. A sanity waveform may be generated for a proven CDC protocol assertion to indicate a stimulus that does not violate the CDC protocol assertion. However, if a violation occurs, a counter-example will be generated that indicates the stimulus causing the violation. A waveform indicating the stimulus that violates the CDC protocol assertion may also be generated. At the end of the formal analysis run, the tcl callback generates a CDC protocol assertion exclusion file. Once the proven assertions are identified, the simulation setup files are updated at act 150 to turn off the proven assertions, since the proven assertions cannot be violated in simulation. For CDC protocol assertions where SystemVerilog is used as the programming language, the proven CDC protocol assertions are turned off using a $assertoff command. Removing the proven CDC protocol assertions will reduce the simulation run time in the next act of the method. An example illustrates the turning off of four CDC protocol assertions:

```
$assertoff
    (0,cdc_protocol.fifo_2332.cdc_fifo_wr_ptr_hamming_
    check.assert_hamming);
$assertoff
    (0,cdc_protocol.fifo_2332.cdc_fifo_rd_ptr_hamming_
    check.assert_hamming);
$assertoff
    (0,cdc_protocol.bus_two_diff_4271.cdc_hamming_
    check.assert_hamming);
$assertoff
    (0,cdc_protocol.two_diff_68078.cdc_sync_stable_
    check.asser_stable);
```

Results Capture

The results of the formal analysis run are captured in a database at the end of the run, providing that the CDC protocol assertion and functional coverage results are recorded. A PLI callback routine is included in the simulation setup files, and at act 161, captures the CDC protocol assertion and functional coverage results from the simulation run by appending the data to the existing CDC static analysis database 112 during the simulation run.

Results Update

A results update step occurs at the end of both the formal analysis and the simulation runs using information provided in the setup files. Based on either a tcl callback step or a PLI callback step, the formal analysis or simulations results, respectively, are parsed through to update the centralized results database 171 with relevant information using the persistent unique identifiers assigned to the CDC path in the CDC static analysis database. An example of this correlation is shown in Table 2 below:

TABLE 2

CDC protocol assertion results following example formal analysis and simulation

| CDC ID | Protocol ID | Formal Result | Simulation Result |
|---|---|---|---|
| handshake_7495 | cdc_protocol_handshake_7495 | Fired | Fired |
| bus_two_diff_1183 | cdc_protocol_bus_two_diff_1183 | Fired | Covered |
| handshake_5883 | cdc_protocol_handshake_5883 | Inconclusive | Uncovered |
| two_diff_19174 | cdc_protocol_two_diff_19174 | Inconclusive | Covered |
| bus_two_diff_4271 | cdc_protocol_bus_two_diff_4271 | Proven | |
| fifo_2332 | cdc_protocol_fifo_2332 | Proven | |
| two_diff_68078 | cdc_protocol_two_diff_68078 | Proven | |

The CDC ID is the name of the CDC structure (e.g., in this case, a CDC synchronizer type) plus the persistent unique identifier. The Protocol ID indicates the CDC protocol assertion plus the persistent unique identifier. The Formal Result is the result of formal analysis of the CDC protocol assertion and is either proven or non-proven. The two non-proven states are "fired", where the CDC protocol assertion has been violated, and "inconclusive" where it has not been possible to provide proof over design state space for the particular provided constraints. The Simulation Result produces four different results, where the CDC protocol assertion is fired (e.g., violated), covered (e.g., the simulation has shown that this CDC protocol assertion holds true and is fully exercised by the same stimulus), evaluated (e.g., the simulation has shown that this CDC protocol assertion holds true and is partially exercised by the same stimulus), and unevaluated (e.g., the simulation has shown that this CDC protocol assertion holds true and was not exercised by the same stimulus).

Persistent Unique Identifier

One key point of the present embodiments is the use of the persistent unique identifier. In general, a CDC path information includes at least one text string, such as, for example, handshake. In one embodiment, the persistent unique identifier is a numerical string generated from the text string. This is typically generated using a mathematical operation to reduce the number of characters in the text string. For example, a hash of the characters in the text string may be created, since this will reduce the number of characters in the text string and provide a unique identification number. The persistent unique identifier is added to the assertion of the CDC path and functional coverage instance names, and may be added to the CDC protocol assertion associated with structures in the CDC path. By providing that everything is labelled using the persistent unique identifier, the updating and correlating of results across all three environments (e.g., the CDC static analysis, the formal analysis, and the simulation) is made possible.

The unique identifier is to be persistent to provide accuracy and traceability through the analysis process. The initial unique identifier is allocated to the CDC path. If the supporting RTL design code changes at some point during the design, this will not affect the unique identifier as long as the structure of the CDC path is not altered. If, for example, it is decided to modify the structure of the CDC path, the unique identifier is no longer persistent, as the unique identifier will change due to the change in the CDC path. Hence, coding changes or changes around, but not affecting, the CDC path will have no effect on the unique identifier, resulting in its persistence.

Visualization of Results

At the end of the process outlined in FIG. 3, a visualization of the results of the formal analysis and simulation is generated. This is to enable either a review of the results by the designer, or the debugging of the code used in the process. One manner in which this may be done is to generate a text file, display, or document, similar to Table 2 above, that enables the designer to review the results. As an alternative to this, the sanity waveform, which is generated during formal analysis to indicate a stimulus that does not violate a CDC protocol and is therefore proven, may be displayed as part of the visualization. In addition, the waveform generated as a result of the counter-example showing a stimulus that does violate a CDC protocol assertion may also be generated.

In order to demonstrate the embodiments described in the above, the verification methodology was tested on real world designs and compared with the same testing done using existing formal analysis and simulation techniques. Three RTL designs were tested: design A, design B, and design C, each having between 1 and 30 million gates.

Tables 3a and 3b illustrate a comparative example. The formal analysis verification and simulation verification, respectively, of a given number of CDC protocol assertions were undertaken using a traditional CDC protocol assertion verification methodology using Questa CDC, Questa PropCheck, and Questa Simulation:

TABLE 3a

CDC Protocol Verification with Formal Analysis

| | | Assertions | | | | |
|---|---|---|---|---|---|---|
| Design | Set Up Time | Total | Non Proven | Proven | Run Time | Formal Coverage |
| A | 10 days | 170 | 79 | 91 | 24 seconds | 100.0% |
| B | 16 days | 800 | 304 | 437 | 5 hours | 92.6% |
| C | 39 days | 8552 | 5673 | 877 | 7 hours | 76.6% |

TABLE 3b

CDC Protocol Verification with Simulation

| Design | Set Up Time | Assertions Total | Failed | Run Time | Simulation Coverage |
|---|---|---|---|---|---|
| A | 10 minutes | 170 | 14 | 20 minutes | 91.7% |
| B | 17 minutes | 800 | 83 | 35 minutes | 88.3% |
| C | 30 minutes | 8552 | 127 | 60 minutes | 79.4% |

Tables 4a and 4b illustrate an example using a method in accordance with embodiments:

TABLE 4a

CDC Protocol Verification with Formal Analysis

| | | Assertions | | | | |
|---|---|---|---|---|---|---|
| Design | Set Up Time | Total | Non Proven | Proven | Run Time | Formal Coverage |
| A | 2 days | 170 | 32 | 138 | 55 seconds | 100.0% |
| B | 5 days | 800 | 119 | 354 | 6 hours | 96.6% |
| C | 7 days | 8552 | 1825 | 4907 | 10 hours | 78.7% |

TABLE 4b

CDC Protocol Verification with Simulation

| Design | Set Up Time | Assertions Total | Failed | Run Time | Simulation Coverage |
|---|---|---|---|---|---|
| A | 1 minute | 32 | 6 | 20 minutes | 97.3% |
| B | 1 minute | 119 | 34 | 35 minutes | 97.1% |
| C | 5 minutes | 1825 | 76 | 60 minutes | 87.5% |

In both the comparative example and that using embodiments, the Formal Coverage is given by:

((Failed Assertions+Covered Assertions)/Total Assertions))*100

For the comparative example, the Simulation Coverage is given by:

((Failed Assertions+Covered Assertions)/Total Assertions))*100

For the example using embodiments, the Simulation Coverage is given by:

((Failed Assertions+Covered Assertions+Proven Assertions)/Total Assertions))*100

Using embodiments, a number of improvements are provided when compared with the traditional verification methodology. A significant reduction in formal analysis set up time is observed due to the automation of setup generation and the reduction of incremental debug iterations for incomplete and incorrect setups. In addition, the setup time for simulation is also reduced. This is again due to the automation of setup generation and the reduction of incremental debug iterations for incomplete and incorrect setups. The automated setup generation and the import of CDC design constraints into formal analysis reduces the formal setup errors and causes a reduction in false firings (e.g., where a false violation on a CDC protocol assertion occurs). The improved formal setup and constraints also resulted in fewer inconclusive CDC protocol assertions and more proofs and violations. Removing proven CDC protocol assertions from simulation results in a higher percentage of fired and covered simulation CDC protocol assertions. Since the proven CDC protocol assertions were not simulated in the example employing embodiments, the proven CDC protocol assertions were considered covered in order to maintain simulation coverage consistency between the traditional and inventive methodologies. A reduction in the number of CDC protocol assertions passed to simulation due to exclusion of formally proven CDC protocol assertions reduces the verification effort required for reviewing proven CDC protocol assertions in simulation. The correlation of structural CDC analysis, formal verification, and simulation results improves debug productivity and leads to easier correlation of protocol errors with associated CDC paths, particularly by employing the persistent unique identifier of embodiments. Therefore, the use of embodiments results in significant advantages when compared with traditional methodology when comparing real world designs.

While the present disclosure has been described in detail with reference to certain embodiments, the present disclosure is not limited to those embodiments. In view of the present disclosure, many modifications and variations would present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within the scope.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method of dynamically verifying clock domain crossing (CDC) paths in a register-transfer level (RTL) design, the method being computer-implemented and comprising:

extracting, from a CDC static analysis database, information regarding a presence of structures in the CDC path and any associated CDC protocol assertions and functional coverage;

binding the CDC protocol assertions and functional coverage to the RTL design in a bind file;

generating formal analysis and simulation setup files from the RTL design, setup, and constraint data for the CDC path extracted from the CDC static analysis database and compiling the bind files using the generated formal analysis and simulation setup files;

running formal analysis of the RTL design, such that proven and non-proven CDC protocol assertions are determined;

updating the simulation setup files, such that the proven CDC protocol assertions are turned off, running a simulation of the RTL design with the non-proven protocol assertions and functional coverage;

updating a centralized results database with results of both the formal analysis and the simulation of the RTL design; and generating a visualization of the formal analysis and simulation results for reviewing or debugging, wherein each CDC path is allocated a persistent unique identifier, and wherein the centralized results database is updated using the persistent unique identifier to label the associated CDC protocol assertions, functional coverage, and results of the formal analysis and simulation.

2. The method of claim 1, wherein the CDC path information comprises at least one text string, and wherein the persistent unique identifier is a numerical string generated from the at least one text string.

3. The method of claim 2, wherein the numerical string is generated using a mathematical operation, such that a number of characters in the at least one text string is reduced.

4. The method of claim 3, wherein the persistent unique identifier is added to the assertion of the CDC path and functional coverage instance names.

5. The method of claim 3, wherein the persistent unique identifier is added to the CDC protocol assertion associated with structures in the CDC path.

6. The method of claim 1, wherein the structures in the CDC path are CDC synchronizers, and wherein the associated CDC protocol assertions are generated based on a type of the CDC synchronizer.

7. The method of claim 1, wherein there is an absence of structures in the CDC path, and wherein the associated CDC protocol assertions are generated based on the absence of the structure.

8. The method of claim 1, wherein the non-proven CDC protocol assertions are violated or inconclusive.

9. The method of claim 8, wherein during formal analysis, a counter-example is generated indicating a stimulus that violates a CDC protocol assertion.

10. The method of claim 9, wherein during formal analysis, a sanity waveform is generated for proven CDC protocol assertions indicating a stimulus that does not violate a CDC protocol assertion.

11. The method of claim 10, wherein the visualization of the formal analysis results comprises displaying the sanity waveform.

12. The method of claim 9, wherein the visualization of the formal analysis and simulation results comprises displaying a waveform showing the stimulus that violates the CDC protocol assertion.

13. The method of claim 12, wherein simulation argument files employ a PLI callback function to capture assertion information comprising data showing whether a stimulus violated a CDC protocol assertion or not.

14. The method of claim 8, wherein simulation argument files and formal files comprise callback functions, such that updating of the centralized results database is enabled.

15. The method of claim 14, further comprising:

updating the static CDC analysis database with results information for the CDC protocol assertion and functional coverage.

16. The method of claim 1, wherein the CDC protocol assertions are SystemVerilog Assertions (SVAs).

17. The method of claim 1, wherein the CDC protocol functional coverage are SystemVerilog coverpoints and covergroups.

18. The method of claim 1, wherein the setup files include:

simulation compile and simulation arguments files;

formal analysis compile and run scripts; and formal analysis constraints files.

19. A data processing system comprising:

a processor configured to dynamically verify clock domain crossing (CDC) paths in a register-transfer level (RTL) design, the processor being configured to dynamically verify the CDC paths in the RTL design comprising the processor being configured to:

extract, from a CDC static analysis database, information regarding a presence of structures in the CDC path and any associated CDC protocol assertions and functional coverage;

bind the CDC protocol assertions and functional coverage to the RTL design in a bind file;

generate formal analysis and simulation setup files from the RTL design, setup, and constraint data for the CDC path extracted from the CDC static analysis database and compile the bind files using the generated formal analysis and simulation setup files;

run formal analysis of the RTL design, such that proven and non-proven CDC protocol assertions are determined;

update the simulation setup files, such that the proven CDC protocol assertions are turned off, run a simulation of the RTL design with the non-proven protocol assertions and functional coverage;

update a centralized results database with results of both the formal analysis and the simulation of the RTL design; and generate a visualization of the formal analysis and simulation results for reviewing or debugging, wherein each CDC path is allocated a persistent unique identifier, and wherein the centralized results database is updated using the persistent unique identifier to label the associated CDC protocol assertions, functional coverage, and results of the formal analysis and simulation.

20. In a non-transitory computer-readable storage medium that stores instructions executable by one or more processors to dynamically verify clock domain crossing (CDC) paths in a register-transfer level (RTL) design, the instructions further comprising:

extracting, from a CDC static analysis database, information regarding a presence of structures in the CDC path and any associated CDC protocol assertions and functional coverage;

binding the CDC protocol assertions and functional coverage to the RTL design in a bind file;

generating formal analysis and simulation setup files from the RTL design, setup, and constraint data for the CDC path extracted from the CDC static analysis database and compiling the bind files using the generated formal analysis and simulation setup files;

running formal analysis of the RTL design, such that proven and non-proven CDC protocol assertions are determined;

updating the simulation setup files, such that the proven CDC protocol assertions are turned off, running a simulation of the RTL design with the non-proven protocol assertions and functional coverage;

updating a centralized results database with results of both the formal analysis and the simulation of the RTL design; and generating a visualization of the formal analysis and simulation results for reviewing or debugging, wherein each CDC path is allocated a persistent unique identifier, and wherein the centralized results database is updated using the persistent unique identifier to label the associated CDC protocol assertions, functional coverage, and results of the formal analysis and simulation.

* * * * *